(12) United States Patent
Chen et al.

(10) Patent No.: US 9,785,375 B2
(45) Date of Patent: Oct. 10, 2017

(54) MIGRATING DATA BETWEEN MEMORY UNITS IN SERVER

(71) Applicant: HUAWEI TECHNOLOGIES CO., LTD., Shenzhen, Guangdong (CN)

(72) Inventors: Ben Chen, Hangzhou (CN); Gang Liu, Hangzhou (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 15/055,926

(22) Filed: Feb. 29, 2016

(65) Prior Publication Data

US 2016/0179436 A1    Jun. 23, 2016

Related U.S. Application Data

(63) Continuation of application No. PCT/CN2014/073933, filed on Mar. 24, 2014.

(30) Foreign Application Priority Data

Aug. 31, 2013   (CN) .......................... 2013 1 0390761

(51) Int. Cl.
| | |
|---|---|
| G06F 13/00 | (2006.01) |
| G06F 3/06 | (2006.01) |
| G06F 1/32 | (2006.01) |
| G06F 11/16 | (2006.01) |
| G06F 11/20 | (2006.01) |

(52) U.S. Cl.
CPC ............ *G06F 3/0647* (2013.01); *G06F 1/325* (2013.01); *G06F 3/061* (2013.01); *G06F 3/0604* (2013.01); *G06F 3/065* (2013.01); *G06F 3/067* (2013.01); *G06F 3/068* (2013.01); *G06F 3/0625* (2013.01); *G06F 3/0668* (2013.01); *G06F 3/0683* (2013.01); *G06F 3/0685* (2013.01);
(Continued)

(58) Field of Classification Search
CPC ....... G06F 3/065; G06F 3/0647; G06F 3/0625
USPC ......... 713/320, 340; 707/610; 711/162, 143, 711/165; 718/1
See application file for complete search history.

(56) References Cited

U.S. PATENT DOCUMENTS

| | | | |
|---|---|---|---|
| 5,235,687 A | 8/1993 | Bacot et al. | |
| 7,099,875 B2 * | 8/2006 | Kedem | G06F 3/0613 707/610 |

(Continued)

FOREIGN PATENT DOCUMENTS

| | | |
|---|---|---|
| CN | 1852146 A | 10/2006 |
| CN | 1940876 A | 4/2007 |

(Continued)

*Primary Examiner* — Aurel Prifti
(74) *Attorney, Agent, or Firm* — Huawei Technologies Co., Ltd.

(57) ABSTRACT

Embodiments of the present invention disclose a data migration method for memory modules in a server and a server. By establishing a mirror relationship between agent apparatuses of two memory modules, a processor in the present invention instructs the agent apparatuses to perform data migration between the two memory modules, to complete migration of data from one memory module to the other memory module. The entire data migration process requires no participation of an operating system, and consumes a short period of time, thereby implementing convenient data migration for memory modules in a server.

13 Claims, 8 Drawing Sheets

(52) U.S. Cl.
CPC ........ *G06F 3/0688* (2013.01); *G06F 11/1666* (2013.01); *G06F 11/20* (2013.01)

(56) References Cited

U.S. PATENT DOCUMENTS

| | | | | |
|---|---|---|---|---|
| 8,296,760 | B2 * | 10/2012 | Magenheimer | G06F 1/3203 718/1 |
| 8,799,586 | B2 * | 8/2014 | Kumar | G06F 12/0817 711/143 |
| 2008/0288795 | A1 * | 11/2008 | Maruyama | G06F 1/3221 713/320 |
| 2009/0006793 | A1 | 1/2009 | Yamada et al. | |
| 2011/0078384 | A1 | 3/2011 | Kumar et al. | |
| 2011/0320847 | A1 * | 12/2011 | Cheung | G06F 1/3225 713/340 |
| 2012/0011508 | A1 * | 1/2012 | Ahmad | G06F 12/1009 718/1 |
| 2012/0159102 | A1 * | 6/2012 | Kan | G06F 3/0613 711/162 |
| 2012/0278571 | A1 * | 11/2012 | Fleming | G06F 9/455 711/162 |
| 2013/0268739 | A1 * | 10/2013 | Gupta | G06F 3/065 711/162 |
| 2014/0052948 | A1 | 2/2014 | Qiu et al. | |
| 2015/0052327 | A1 * | 2/2015 | Ancajas | G06F 3/0647 711/165 |
| 2016/0041601 | A1 * | 2/2016 | Larson | G06F 1/3287 713/320 |
| 2016/0253112 | A1 * | 9/2016 | Chen | G06F 3/0619 |

FOREIGN PATENT DOCUMENTS

| | | |
|---|---|---|
| CN | 101662506 A | 3/2010 |
| CN | 102326149 A | 1/2012 |
| CN | 102761566 A | 10/2012 |
| CN | 103198028 A | 7/2013 |
| CN | 103324582 A | 9/2013 |
| CN | 103455372 A | 12/2013 |
| EP | 0372578 A2 | 6/1990 |
| JP | H2-278353 A | 11/1990 |
| JP | H7-013789 A | 1/1995 |

\* cited by examiner

MIGRATING DATA BETWEEN MEMORY UNITS IN SERVER

CROSS-REFERENCE TO RELATED APPLICATIONS

This application is a continuation of International Application No. PCT/CN2014/073933, filed on Mar. 24, 2014, which claims priority to Chinese Patent Application No. 201310390761.8, filed on Aug. 31, 2013, both of which are hereby incorporated by reference in their entireties.

TECHNICAL FIELD

The present invention relates to the field of storage technologies, and in particular, to a data migration method for memory modules in a server and a server.

BACKGROUND

Mainly applied in the field of servers, memory hot-swap technology improves availability and maintainability of a server. According to the memory hot-swap technology, a server includes a hardware layer, a Basic Input Output System (BIOS) layer, an operating system Operating System (OS) (which may further includes a Virtual Machine Monitor (VMM)) layer. The VMM layer includes at least two memory modules. FIG. 1 shows relationships between the layers. In the logical structure that is shown, the hardware layer provides physical resources that are actually available; the BIOS layer configures these physical resources, reports available resources, and provides an operation interface; the OS may directly use the resources reported by the BIOS, or the VMM virtualizes the resources and then allocates the virtualized resources to the OS for use, that is, the OS is an ultimate user of these resources. In a memory hot-swap technology, the hardware layer provides substantive memory modules and access channels; the BIOS layer initializes a memory, allocates addresses, and reports available addresses to the OS or the VMM; and finally the OS runs a program in or stores data into the memory. Memory hot-swap includes two processes: memory hot-add and memory hot-remove.

In the prior art, when memory hot-remove is performed, the OS first needs to migrate data at memory addresses that is to be hot-removed to other memory addresses. However, each time before the OS migrates a memory page, the OS needs to gain control of the page and suspends access of another program. Therefore, if to-be-migrated user data is frequently accessed by another program, it takes the OS some time to gain control of the memory page each time. Subsequently, it takes a long time to complete data migration for an entire memory module.

In summary, memory data migration depends closely on the OS, and data distribution and a memory data migration capability that are of the OS may affect success or failure of memory data migration. Therefore, how to implement convenient data migration of a memory module becomes a problem to be urgently addressed currently.

SUMMARY

In view of this, embodiments of the present invention provide a data migration method for memory modules in a server to implement convenient data migration.

According to a first aspect, a data migration method for memory modules in a server is provided, where the method includes:

searching, by a processor when receiving a data migration request of a user for a first memory module, for a second memory module, and sending a mirror relationship establishment instruction to a first agent apparatus, where the first memory module is in a running state and the second memory module is in an idle state;

receiving, by the first agent apparatus, the mirror relationship establishment instruction, and establishing a mirror relationship with a second agent apparatus;

sending, by the processor, a data migration instruction to the first agent apparatus;

receiving, by the first agent apparatus, the data migration instruction, and sending data in the first memory module to the second agent apparatus;

writing, by the second agent apparatus, the data in the first memory module into the second memory module;

sending, by the processor, a mirror relationship canceling instruction to the first agent apparatus, and setting the first memory module and the second memory module to an idle state and a running state, respectively; and receiving, by the first agent apparatus, the mirror relationship canceling instruction, and canceling the mirror relationship with the second agent apparatus.

In a first possible implementation manner, the receiving, by the first agent apparatus, the data migration instruction, and sending data in the first memory module to the second agent apparatus includes:

receiving, by the first agent apparatus, a data read instruction sent by the processor, reading the data in the first memory module, and returning the data in the first memory module to the processor; and receiving, by the first agent apparatus, the data in the first memory module that is written by the processor, and sending the data in the first memory module to the second agent apparatus.

With reference to the first aspect or the first possible implementation manner of the first aspect, in a second possible implementation manner, before the sending, by the processor, a mirror relationship canceling instruction to the first agent apparatus, the method further includes:

writing, by the processor, first data to a first physical address of the first agent apparatus;

receiving, by the first agent apparatus, the first data, and forwarding the first data to the second agent apparatus; and writing, by the second agent apparatus, the first data to the first physical address in the second memory module.

With reference to the first aspect, the first possible implementation manner of the first aspect, or the second possible implementation manner of the first aspect, in a third possible implementation manner, after the receiving, by the first agent apparatus, the mirror relationship canceling instruction, and canceling the mirror relationship with the second agent apparatus, the method further includes:

powering off, by the processor, the first memory module, so as to remove the first memory module.

With reference to the first aspect, the first possible implementation manner of the first aspect, the second possible implementation manner of the first aspect, the third possible implementation manner of the first aspect, in a fourth possible implementation manner, the method further includes:

supplying, by the processor when receiving a memory module adding request of the user, power to an added memory module, and initializing the added memory module, and the added memory module enters an idle state.

According to a second aspect, a server is provided, where the server includes:

a processor, a first agent apparatus and a second agent apparatus that are connected to the processor, a first memory module connected to the first agent apparatus, and a second memory module connected to the second agent apparatus; where:

the processor is configured to: when the processor receives a data migration request of a user for the first memory module, the first memory module is in a running state, and the second memory module is in an idle state, search for the second memory module, and send a mirror relationship establishment instruction to the first agent apparatus;

the first agent apparatus is configured to receive the mirror relationship establishment instruction, and establish a mirror relationship with the second agent apparatus after receiving the mirror relationship establishment instruction;

the processor is further configured to send a data migration instruction to the first agent apparatus after the establishment of the mirror relationship is complete;

the first agent apparatus is further configured to receive the data migration instruction, and send data in the first memory module to the second agent apparatus after receiving the data migration instruction;

the second agent apparatus is configured to receive the data sent by the first agent apparatus, and write the data in the second memory module;

the processor is further configured to: after migration of the data is complete, send a mirror relationship canceling instruction to the first agent apparatus; and after sending the mirror relationship canceling instruction, set the first memory module and the second memory module to an idle state and a running state, respectively; and the first agent apparatus is further configured to cancel the mirror relationship with the second agent apparatus after receiving the mirror relationship canceling instruction.

In a first implementation manner, that the first agent apparatus is further configured to receive the data migration instruction, and send data in the first memory module to the second agent apparatus after receiving the data migration instruction includes:

the first agent apparatus is further configured to receive a data read instruction sent by the processor, read the data in the first memory module after receiving the data read instruction, and return the data in the first memory module to the processor; and the first agent apparatus is further configured to receive the data in the first memory module that is written by the processor, and send the data in the first memory module to the second agent apparatus.

With reference to the second aspect or the first possible implementation manner of the second aspect, in a second possible implementation manner, the processor is further configured to write first data to a first physical address of the first agent apparatus;

the first agent apparatus is further configured to forward the first data to the second agent apparatus after receiving the first data; and the second agent apparatus is further configured to write the first data to the first physical address in the second memory module after receiving the first data forwarded by the second agent apparatus.

With reference to the second aspect, the first possible implementation manner of the second aspect, or the second possible implementation manner of the second aspect, in a third possible implementation manner, the processor is further configured to: after the migration of the data is complete and after sending the mirror relationship canceling instruction, power off the first memory module, so as to remove the first memory module.

With reference to the second aspect, the first possible implementation manner of the second aspect, the second possible implementation manner of the second aspect, or the third possible implementation manner of the second aspect, in a fourth possible implementation manner, the processor is further configured to: when receiving a memory module adding request of the user, supply power to an added memory module, initialize the added memory module, and the added memory module becomes an idle memory module.

According to the technical solution of the data migration method for memory modules in a server and the server that are provided in the present invention, by establishing a mirror relationship between agent apparatuses of two memory modules, a processor instructs the agent apparatuses to perform data migration between the two memory modules, to complete migration of data from one memory module to the other memory module. The entire data migration process requires no participation of an operating system, and consumes a short period of time, thereby implementing convenient data migration for memory modules in a server.

BRIEF DESCRIPTION OF DRAWINGS

To describe the technical solutions in the embodiments of the present invention or in the prior art more clearly, the following briefly introduces the accompanying drawings required for describing the embodiments or the prior art. Apparently, the accompanying drawings in the following description show merely some embodiments of the present invention, and a person of ordinary skill in the art may still derive other drawings from these accompanying drawings without creative efforts.

DESCRIPTION OF EMBODIMENTS

The following clearly describes the technical solutions in the embodiments of the present invention with reference to the accompanying drawings in the embodiments of the present invention. The described embodiments are merely some but not all of the embodiments of the present invention. All other embodiments obtained by a person of ordinary skill in the art based on the embodiments of the present invention without creative efforts shall fall within the protection scope of the present invention.

Figure 1:
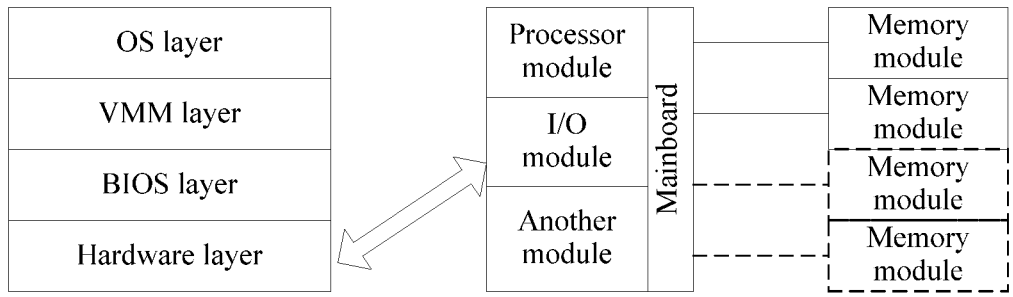
FIG. 1 is a schematic diagram of relationships between layers of a server that are involved in memory hot-swap in the prior art.
Figure 2:
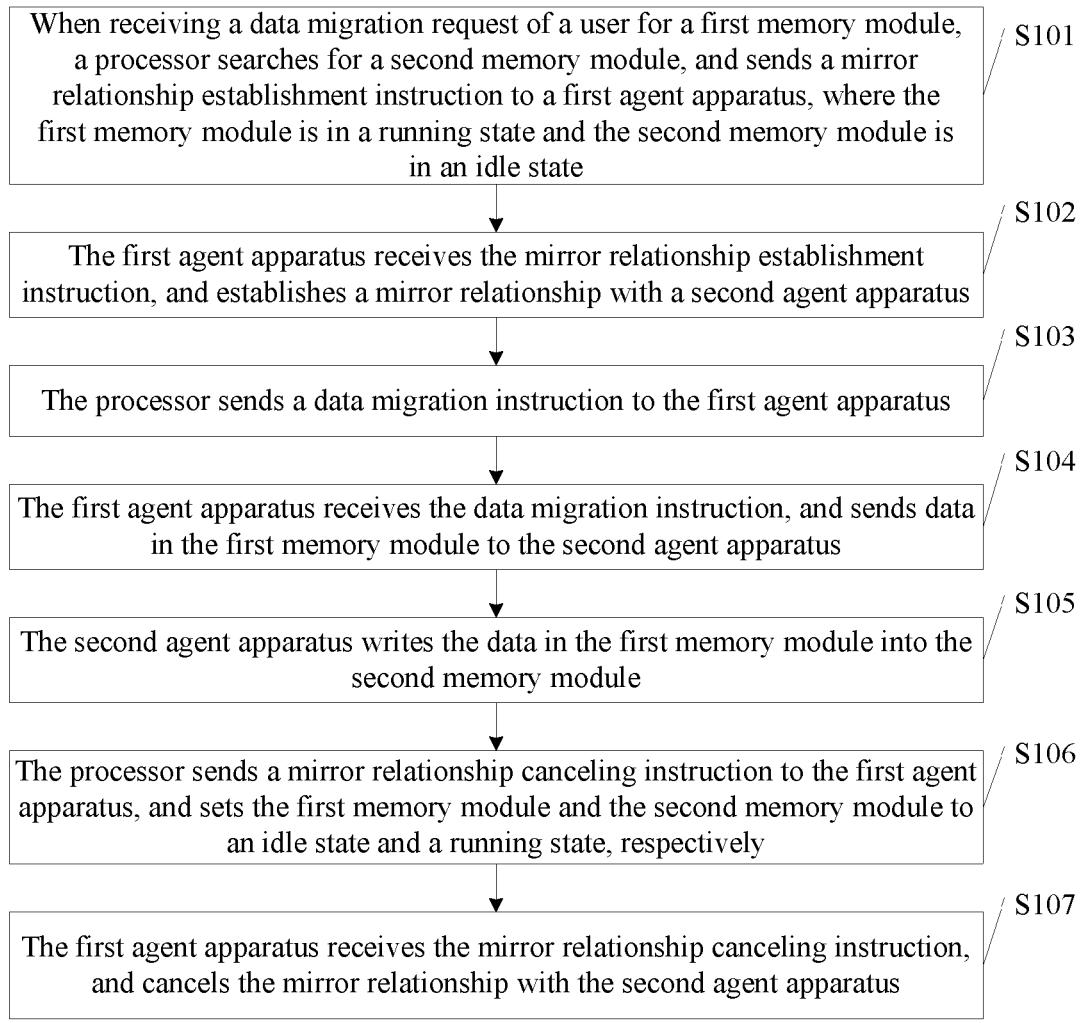
FIG. 2 is a flowchart of a data migration method for memory modules in a server according to an embodiment of the present invention.

FIG. 2 is a flowchart of a data migration method for memory modules in a server according to an embodiment of the present invention. As shown in FIG. 2, the method includes the following steps:

Step S101. When receiving a data migration request of a user for a first memory module, a processor searches for a second memory module, and sends a mirror relationship establishment instruction to a first agent apparatus, where the first memory module is in a running state and the second memory module is in an idle state.

Step S102. The first agent apparatus receives the mirror relationship establishment instruction, and establishes a mirror relationship with a second agent apparatus.

In this embodiment of the present invention, the server includes at least two memory modules, for example, the first memory module and the second memory module, where the first memory module is in a running state and the second memory module is in an idle state. The memory modules may be memory cards, that is, Dual In-line Memory Module (DIMM, also referred to as memory bar) are installed on memory cards, and then the memory cards are inserted to a mainboard. The first memory module stores data. The processor allocates physical addresses to the first memory module, and reports the physical addresses to an OS. The OS may run programs or store data in the first memory module. The processor only performs memory initialization on the second memory module, without allocating any physical address to the second memory module, or notifying the OS of existence of the second memory module. Therefore, the OS does not use the second memory module.

In this embodiment of the present invention, each memory module involved in a data migration process is connected to an agent apparatus. The agent apparatus receives a request of the processor to access memory addresses, where the memory addresses are addresses of a local (Home/Local) memory module for which the agent apparatus serves as an agent, and sends, by using the processor, a result returned by the memory modules back to an original memory access requester.

When expecting to migrate all data in the first memory module of the server, so as to remove the first memory module, the user sends a data migration request to the processor. After receiving the data migration request of the user for the first memory module, the processor searches for a memory module in an idle state, that is, the second memory module, and sends a mirror relationship establishment instruction to an agent apparatus A connected to the first memory module. After receiving the mirror relationship establishment instruction, the agent apparatus A establishes a mirror relationship with an agent apparatus B connected to the second memory module. The mirror relationship means that the second memory module does not have any physical address during initialization; after the agent apparatus A and the agent apparatus B establish the mirror relationship, the second memory module has a same physical address as the first memory module. After receiving, from the processor, data to be written to a physical address of the first memory module, the agent apparatus A writes the data to the physical address of the first memory module, and also writes the data to the agent apparatus B. Then the agent apparatus B writes the data to the same physical address in the second memory module.

It may be understood that an operation executed by the processor in the present invention may be actually completed by a BIOS program in the processor.

Step S103. The processor sends a data migration instruction to the first agent apparatus.

Step S104. The first agent apparatus receives the data migration instruction, and sends data in the first memory module to the second agent apparatus.

Step S105. The second agent apparatus writes the data in the first memory module into the second memory module.

After the agent apparatus A and the agent apparatus B establish the mirror relationship, the processor sends the data migration instruction to the agent apparatus A, to migrate the data from the first memory module to the second memory module. After receiving the data migration instruction, the agent apparatus A acquires to-be-migrated data from the first memory module, and sends the data to the agent apparatus B. The agent apparatus B writes the data into the second memory module, where a physical address of the data written into the second memory module is consistent with a physical address of the data in the first memory module.

Step S106. The processor sends a mirror relationship canceling instruction to the first agent apparatus, and sets the first memory module and the second memory module to an idle state and a running state, respectively.

Step S107. The first agent apparatus receives the mirror relationship canceling instruction, and cancels the mirror relationship with the second agent apparatus.

After all the data in the first memory module is migrated, the processor sends the mirror relationship canceling instruction to the agent apparatus A, to instruct the agent apparatus A and the agent apparatus B to cancel the mirror relationship. After receiving the mirror relationship canceling instruction, the agent apparatus A cancels the mirror relationship with the agent apparatus B, and changes an agent apparatus that receives a read or write instruction for a segment of physical addresses from the agent apparatus A to the agent apparatus B. In this way, the first memory module is switched to an idle state, the second memory module is switched to a running state, and when reading or writing data for the segment of physical addresses, the processor reads data from or writes data into the second memory module by using the agent apparatus B. Before and after the data migration, the physical addresses of the first memory module remain unchanged; therefore, the data migration process is invisible for the OS and application programs running on the OS.

It may be understood that in the server, there is more than one memory module in a running state and more than one memory module in an idle state. The processor may select an appropriate memory module in an idle state for a memory module in a running state, to perform data migration, and the processor may simultaneously or sequentially complete data migration for multiple memory modules in a running state.

According to the data migration method for memory modules in a server that is provided in this embodiment of the present invention, by establishing a mirror relationship between agent apparatuses of two memory modules, a processor instructs the agent apparatuses to perform data migration between the two memory modules, to complete migration of data from one memory module to the other memory module. The entire data migration process requires no participation of an operating system, and consumes a short period of time, thereby implementing convenient data migration for memory modules in a server.

Figure 3:
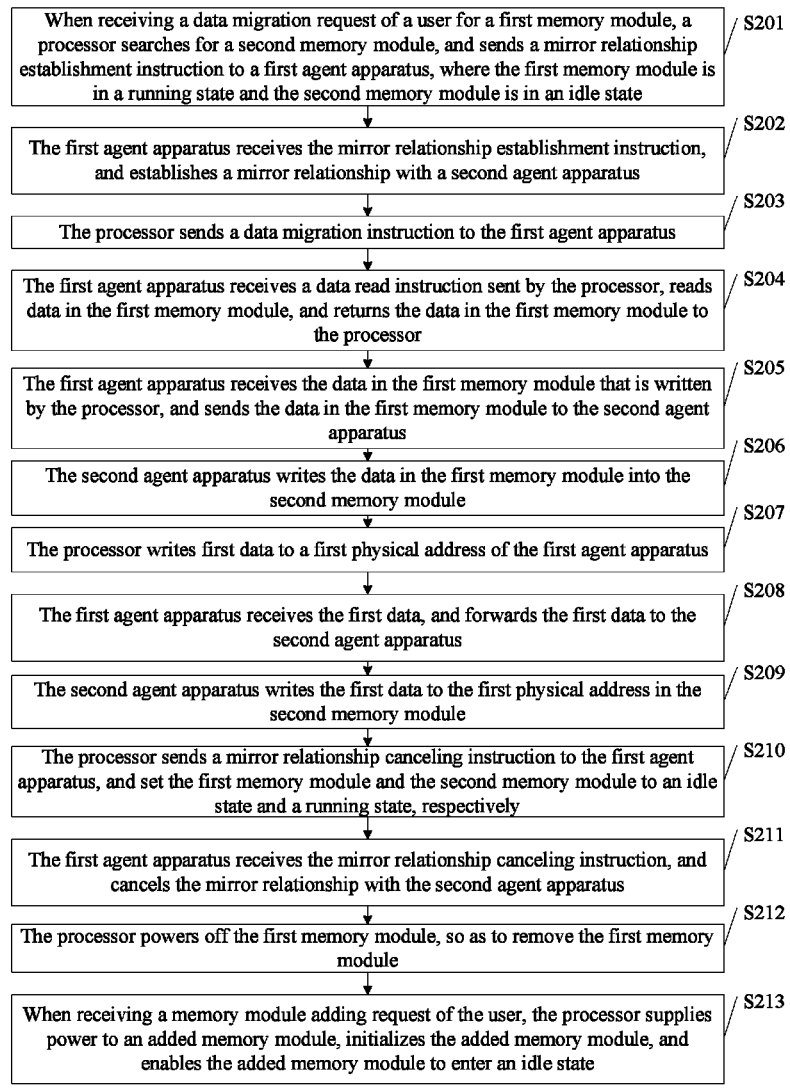
FIG. 3 is a flowchart of a data migration method for memory modules in a server according to another embodiment of the present invention.

FIG. 3 is a flowchart of a data migration method for memory modules in a server according to another embodiment of the present invention. As shown in FIG. 3, the method includes the following steps:

Step S201. When receiving a data migration request of a user for a first memory module, a processor searches for a second memory module, and sends a mirror relationship establishment instruction to a first agent apparatus, where the first memory module is in a running state and the second memory module is in an idle state.

Step S202. The first agent apparatus receives the mirror relationship establishment instruction, and establishes a mirror relationship with a second agent apparatus.

Figure 6A:
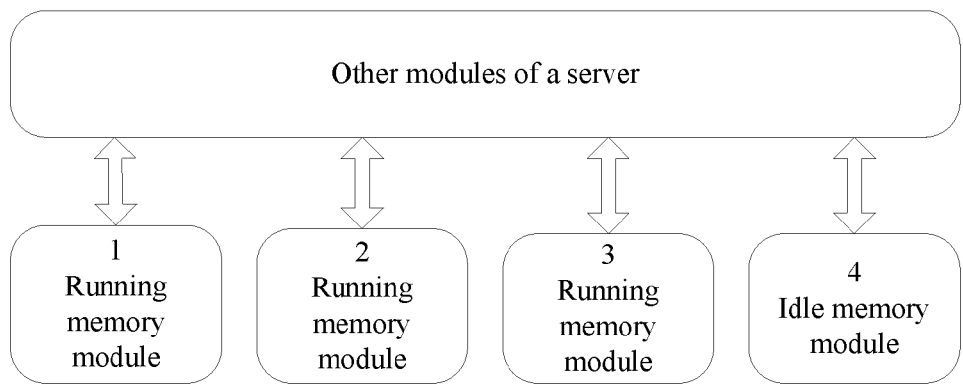
FIG. 6A is a schematic structural diagram of memory modules included in a server, according to another embodiment of the present invention.

As shown in FIG. 6a, a server includes multiple memory modules, where memory modules 1, 2, and 3 are memory modules in a running state and store data. A processor allocates physical addresses to the memory modules 1, 2, and 3, and reports the physical addresses to an OS. The OS may run programs or store data in the memory modules 1, 2, and 3. A memory module 4 is a memory module in an idle state, and the processor only performs memory initialization on the memory module 4 without allocating any physical address to the memory module 4 or notifying the OS of the existence of the idle memory module. Therefore, the OS does not use the memory module 4. In the server that has the multiple memory modules, a memory module with a maximum capacity is selected as a memory module in an idle state. In addition, memory bars with a same capacity may be selected for the memory modules set to a running state and the memory modules set to the idle state, so that any memory module may become a memory module in an idle state to facilitate data migration.

When expecting to migrate all data in a memory module of the server and in a running state, so as to remove the memory module, the user sends a data migration request to the processor. Generally, in design of structures of memory modules in a server, a user operation interface is used to receive a hot-swap command of the user, and display a progress of hot-swap to the user. In the flowchart of hot-removing memory modules shown in FIG. 4 and the flowchart of hot-adding memory modules shown in FIG. 5, the user operation interface is a button. When the user presses the button, a data migration and memory module removal command is delivered to the processor.

Figure 7A:
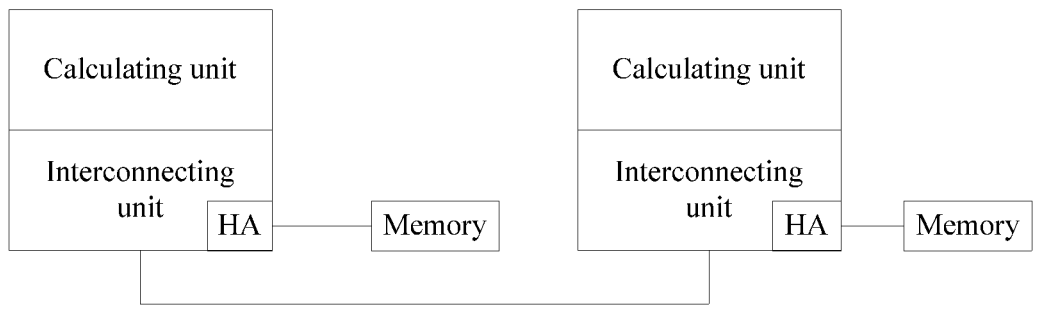
FIG. 7A is a schematic structural diagram of agent apparatuses HAs and memory modules, according to another embodiment of the present invention.

In this embodiment of the present invention, an agent apparatus connected to a memory module is a local agent apparatus (Home Agent, HA) shown in FIG. 7A, where an HA is a component in the Intel QuickPath Interconnect (Quick-Path Interconnect, QPI) protocol, and modern Intel processors are interconnected by using a QPI bus. The HA is responsible for receiving access requests of a QPI for memory modules, and sending a result returned by the memory modules back to an original memory access requester.

FIG. 7A shows a method for interconnecting two Intel processors. Each processor is divided into many units, and only a calculating unit and an interconnecting unit are drawn herein. The calculating unit sends an address access request, and the interconnecting unit distributes the address request to a corresponding sub-module, for example, an HA, or forwards the address request to an interconnecting unit of another processor by using a QPI. The HA, a sub-module of the interconnecting unit, receives a request of the interconnecting unit to access a memory mounted to the HA. The request may come from the calculating unit in the processor in which the HA is located, or may come from a calculating unit of another processor.

Figure 7B:
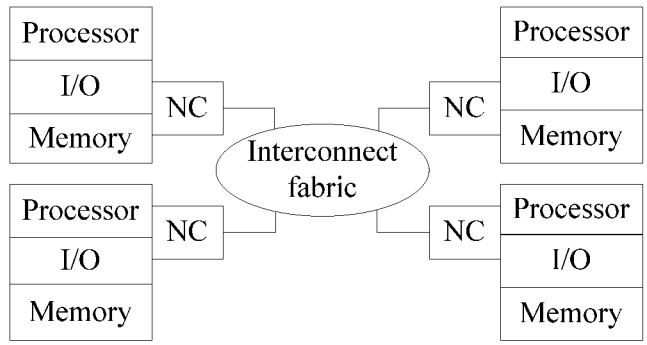
FIG. 7B is a schematic structural diagram of node controllers NCs and memory modules, according to another embodiment of the present invention.

An agent apparatus connected to a memory module may also be an Extended Node Controller (XNC) or a Node Controller (NC). As shown in FIG. 7B, processors are interconnected by using a QPI or an XNC/NC. A QPI of each processor is connected to an XNC, and then all the processors are combined to form a big server through an interconnect network of the XNC. All processors, memories, and I/O connected to each XNC are collectively referred to as a node (node), so one of various functions of the XNC is similar to that of HA, that is, receiving a request that is for accessing a memory in the node and is sent by an interconnect fabric.

In summary, an HA and an XNC/NC have a same function in this embodiment of the present invention, that is, receiving a request to access memory addresses, where the memory addresses are addresses of a local memory module for which the HA or XNC/NC serves as an agent.

Figure 8A:
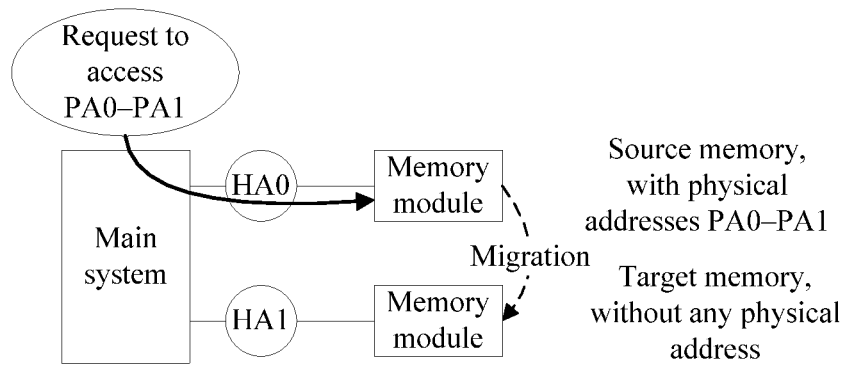
FIG. 8A is a schematic diagram of a server performing a data migration process for memory modules, according to another embodiment of the present invention.

As shown in FIG. 8A, when receiving a data migration request of a user for a memory module in a running state, a processor searches for a memory module in an idle state, and sends a mirror relationship establishment instruction to an agent apparatus HA0 connected to the memory module in a running state. The agent apparatus HA0 receives the mirror relationship establishment instruction, and establishes a mirror relationship with an agent apparatus HA1 connected the memory module in an idle state. The mirror relationship means that the memory module in an idle state does not have any physical address during initialization, and after the agent apparatus HA0 and the agent apparatus HA1 establish the mirror relationship, the memory module in an idle state has a same physical address PA0-PA1 as the memory module in a running state. After receiving, from the processor, data to be written to a physical address of the memory module in a running state, the agent apparatus HA0 writes the data to the physical address of the memory module in a running state, and also writes the data to the agent apparatus HA1. Then HA1 writes the data to the same physical address in the second memory module.

Step S203. The processor sends a data migration instruction to the first agent apparatus.

Step S204. The first agent apparatus receives a data read instruction sent by the processor, reads data in the first memory module, and returns the data in the first memory module to the processor.

Step S205. The first agent apparatus receives the data in the first memory module that is written by the processor, and sends the data in the first memory module to the second agent apparatus.

Step S206. The second agent apparatus writes the data in the first memory module into the second memory module.

Figure 6B:
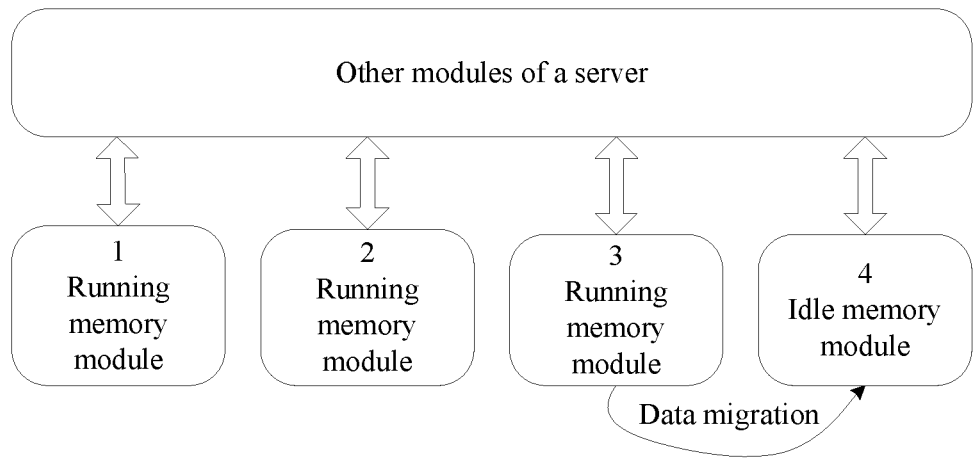
FIG. 6B is a schematic diagram of data migration of memory modules in a server, according to another embodiment of the present invention.

As shown in FIG. 6B, data in a memory module 3 in a running state is gradually migrated to a memory module 4 in an idle state, and a process of the data migration includes two processes: data reading and data writing. A processor sends a data read instruction to HA0; HA0 receives the data read instruction, reads data in the memory module in a running state, and returns the data in the memory module in a running state to the processor. The processor writes the data in the memory module in a running state into HA0, HA0 forwards the data in the memory module in a running state to HA1, and HA1 writes the data in the memory module in a running state into the memory module 4 in an idle state.

Specifically, working principles of HA0 and HA1 are as follows: after HA0 and HA1 establish a mirror relationship, the two HAs in the server form a mirror pair, as shown in FIG. 7A. After the two HAs form a mirror pair, one HA is a mirrored master side (Mirrored Master side) and the other is a mirrored slave side (Mirrored Slave side). In an application example of data migration for memory modules, the mirrored master side is an HA always used in the server, and the mirrored slave side is an HA that is used for backup and waits for migration. From the beginning of establishing a temporary mirror pair, the slave HA has a same physical address as the master HA, but data in the slave HA and the master HA is not consistent. Therefore, data migration needs to be performed.

A specific data migration process is that a processor traverses all addresses of an HA in ascending order of the addresses, and some addresses are involved each time:

1. Read data at an address PA0 from a memory module to a processor.

2. Write the data back to the original address PA0.

3. The master HA receives an address write request and performs two operations, one of which is writing the data to the address PA0 of a memory of the master HA.

4. The master HA knows that there is a mirror HA in the server, so the other operation of the master HA is forwarding a data packet to the slave HA.

5. The slave HA receives the data packet and writes the data to the address PA0 of a memory of the slave HA.

At this point, the address PA0 has same duplicates in the two HAs, which is equivalent to that the data at PA0 of the master HA is migrated to the address PA0 of the slave HA.

When the processor completes traversing all the addresses of the master HA, data migration for memories in the HA is completed.

Step S207. The processor writes first data to a first physical address of the first agent apparatus.

Step S208. The first agent apparatus receives the first data, and forwards the first data to the second agent apparatus.

Step S209. The second agent apparatus writes the first data to the first physical address in the second memory module.

Data migration for memory modules is not a task that can be completed immediately, and needs to consume a period of time. A time length is in direct proportion to a capacity of a memory module for which migration is to be performed. During the period of migration, two master devices may perform read or write operations on a memory module 3 in a running state. One master device is HA0 on the memory module 3 in a running state, which gradually traverses addresses of the memory module 3 in a running state, and copies data to a memory module 4 in an idle state; the other master device is a bus (for example, a QPI) of the server that sends a read or write request, where the request is a read or write request of the server that runs normally for the memory module 3 in a running state. If no mirror relationship exists, when HA0 migrates data at some addresses, and the QPI sends a write operation on these addresses to change memory values, data in two memory modules are inconsistent after the migration is complete. In this case, a switchover may not occur. The mirroring enables data to be written into two memory modules simultaneously in all write operations, thereby ensuring consistency.

During the migration process, if an OS needs to perform a write operation on an address HA1 of the master HA, actually the foregoing steps 2 to 5 are performed. Therefore, consistency between data in two HAs may still be ensured.

Step S210. The processor sends a mirror relationship canceling instruction to the first agent apparatus, and set the first memory module and the second memory module to an idle state and a running state, respectively.

Step S211. The first agent apparatus receives the mirror relationship canceling instruction, and cancels the mirror relationship with the second agent apparatus, and the memory module in an idle state becomes a memory module in a running state.

Figure 6C:
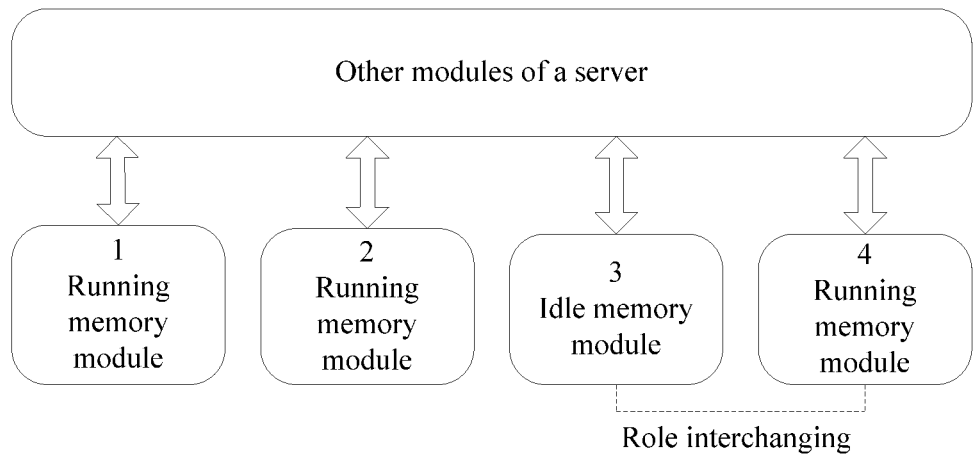
FIG. 6C is a schematic diagram according to another embodiment of the present invention of role interchanging of memory modules in a server after data migration of the memory modules are complete.
Figure 8B:
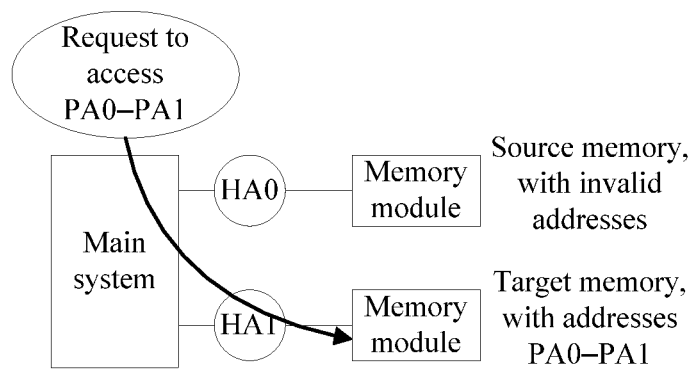
FIG. 8B is a schematic diagram of a server after a data migration process for memory modules is complete, according to another embodiment of the present invention.

As shown in FIG. 6C, after all the data in the memory module in a running state is migrated, the processor sends the mirror relationship canceling instruction to HA0 to cancel the mirror relationship between HA0 and HA1, and changes the agent apparatus that receives a segment of physical addresses from HA0 to HA1. In this way, the original memory module in a running state is switched to an idle state, physical addresses of the memory module become invalid, and the processor cannot write data into or read data from the physical addresses. The original memory module in an idle state is switched to a running state, has same physical addresses PA0-PA1 as the original memory module in a running state, and receives a read or write operation of the processor for the segment of physical addresses. As shown in FIG. 8b, roles of the memory module in an idle state and the memory module in a running state are interchanged. However, before and after the data migration and role interchanging, the physical addresses remain unchanged. Therefore, the data migration process is invisible for the OS and application programs running on the OS. Due to invisibility, for a memory module corresponding to HA0, migration can be completed regardless of whether there is kernel mode data of the OS in the memory module, and whether the data is frequently occupied by an application (such as a database), thereby greatly improving feasibility of memory hot-remove.

Step S212. The processor powers off the first memory module, so as to remove the first memory module.

After the data migration and role interchanging are complete, the original memory module in a running state is actually switched to an idle state. The memory module may be powered off, so as to remove the memory module.

Figure 4:
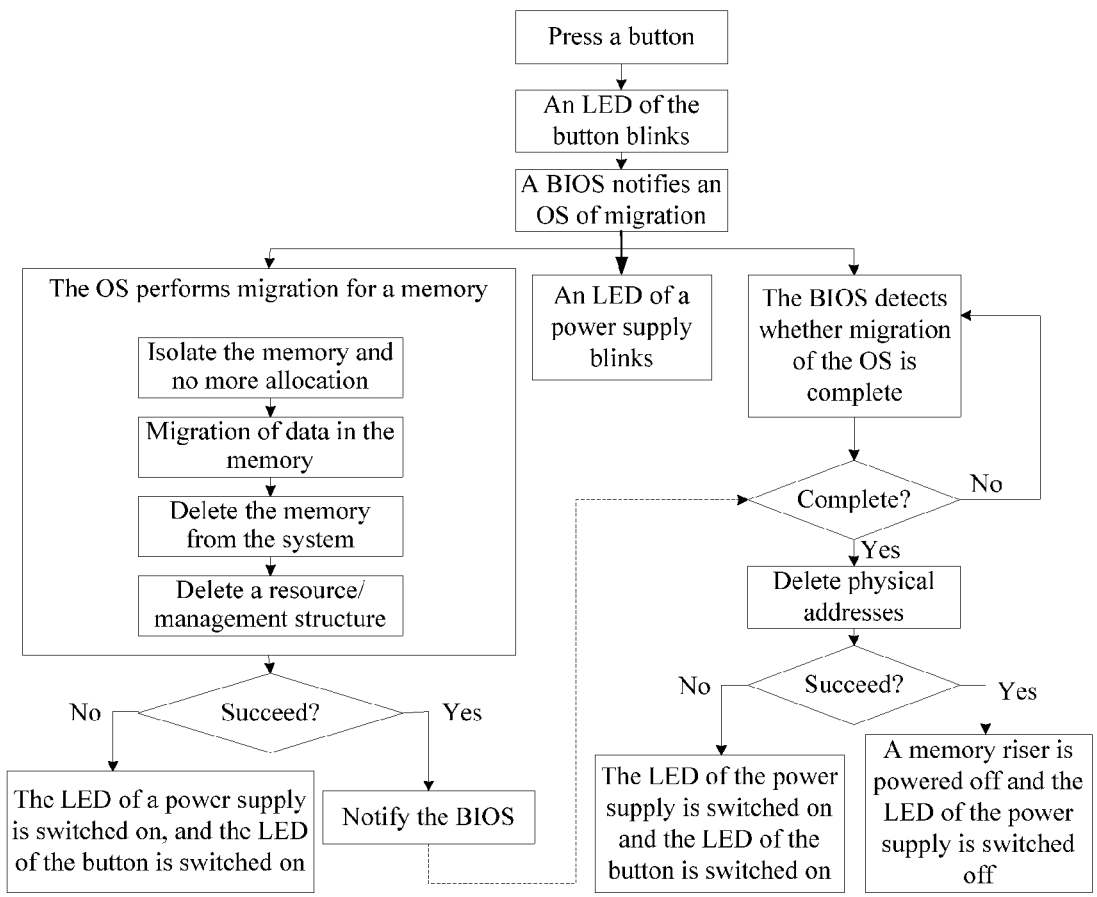
FIG. 4 is a flowchart of hot-removing a memory module in the prior art.

FIG. 4 shows a procedure for hot-removing a memory module, where the procedure includes the following steps:

a) Press a button, indicating that a command is initiated.

b) An LED of the button starts blinking, indicating that the command has been received.

c) A BOIS forwards the command to an OS, instructing the OS to perform migration for a to-be-removed memory.

d) At the same time as the last step, an LED of a power supply starts blinking, indicating that a hot-remove procedure starts.

e) The OS performs migration for the memory, and migrates services running at addresses of the memory to addresses of another memory.

f) At the same time as the last step, the BIOS starts repeatedly querying whether the OS has completed data migration.

g) If the OS has migrated data successfully, the OS notifies the BIOS of a result indicating successful migration.

h) If the OS fails to migrate data, restore the LED of the power supply to a steady-on state, indicating that the hot-remove process ends, and set the LED of the button to steady on, notifying a user of a hot-add failure (an operation of the LED is actually a behavior of the BIOS, and timeout occurs because the BIOS does not receive a notification of the OS; therefore, it is determined that the OS fails to migrate data).

i) If the BIOS receives a notification of the OS, the BIOS deletes the physical addresses, which is actually disabling a request to access addresses of the removed memory module.

j) If the operation of the BIOS succeeds, power off a memory riser, and set the LED of the power supply to steady off, indicating that the hot-remove is complete.

k) If the operation of the BIOS fails, restore the LED of the power supply to steady on, indicating that the hot-remove process ends, and set the LED of the button to steady on, notifying the user of a hot-add failure.

Different from the procedure for hot-removing a memory module shown in FIG. 4, hot-removing a memory module by using the data migration method provided in this embodiment of the present invention requires no participation of an OS, and is completed by a processor, that is, the foregoing BIOS program, by controlling a master HA. That is, the foregoing steps c) to i) are replaced with step S201 to step S211 in this embodiment of the present invention.

Step S213. When receiving a memory module adding request of the user, the processor supplies power to an added memory module, and initializes the added memory module, and the added memory module enters an idle state.

Figure 6D:
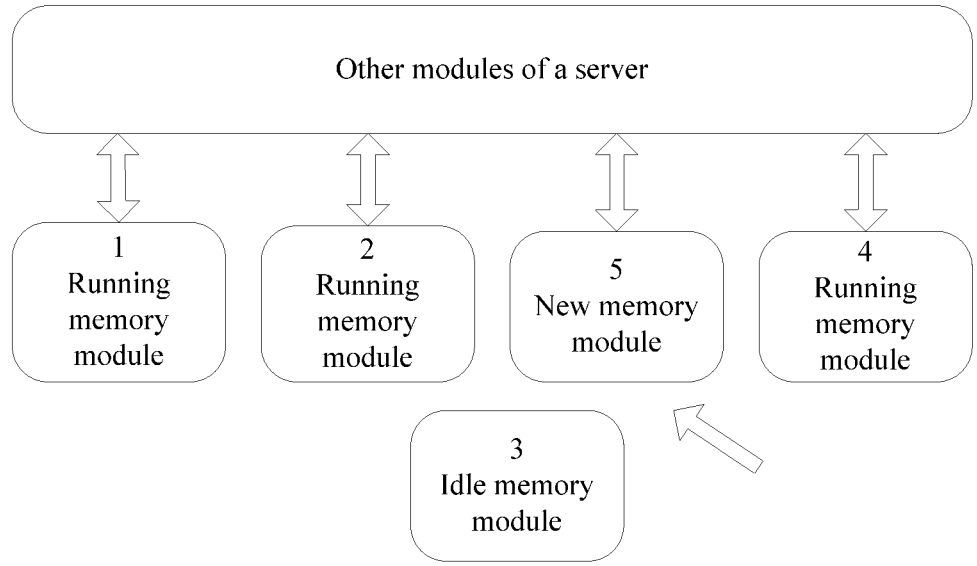
FIG. 6D is a schematic diagram of replacing an idle memory module in a server, according to another embodiment of the present invention.

As shown in FIG. 6D, after a memory module 3 in an idle state in FIG. 6C is removed, a new memory module 5 is hot-added. A user may initiate a hot-add operation to the new memory module by using an operation interface such as a button. A procedure for the hot-add operation is the same as that in the prior art.

Figure 5:
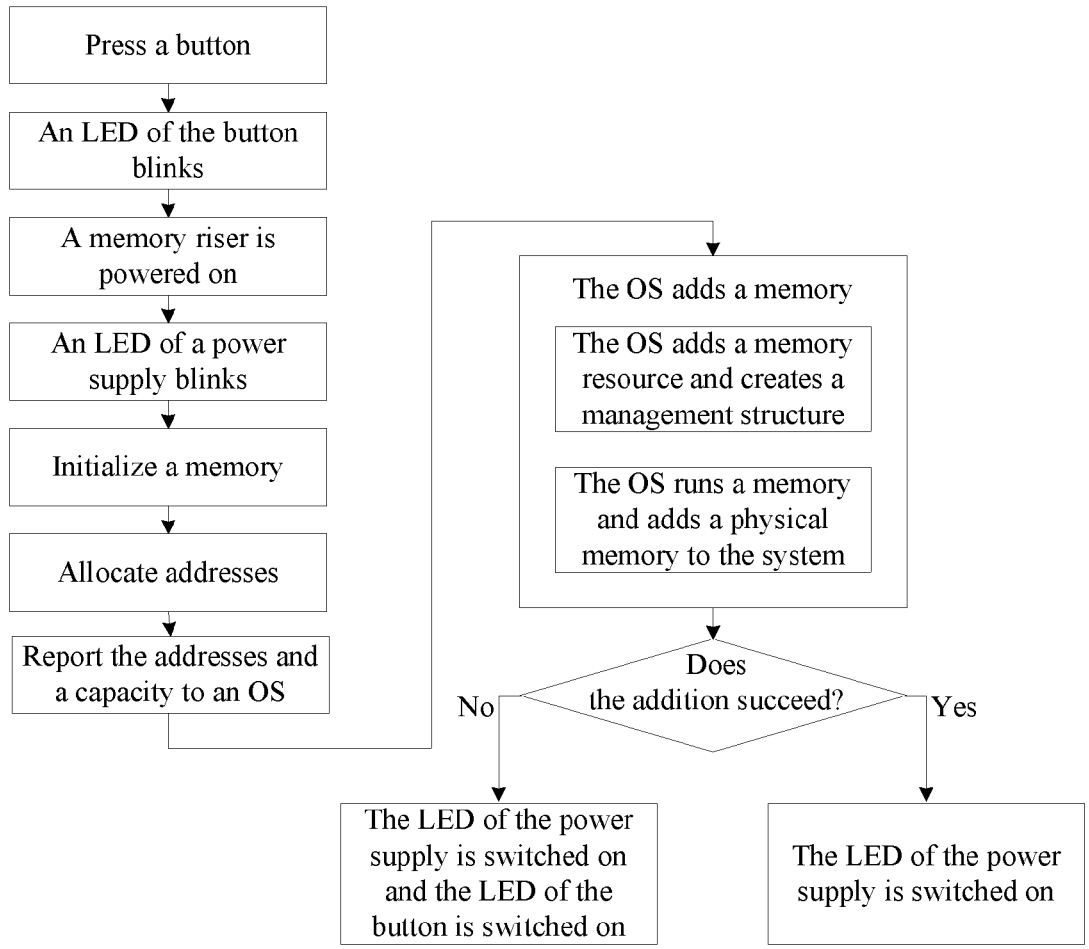
FIG. 5 is a flowchart of hot-adding a memory module in the prior art.

FIG. 5 is a procedure for hot-adding a memory module in the prior art, where the procedure includes the following steps:

A. Press a button, indicating that a command is initiated.

B. An LED of the button starts blinking, indicating that the command has been received.

C. Supply power to a memory card (memory riser).

D. An LED of a power supply starts blinking and remains blinking before the hot-add procedure is complete.

E. A BIOS performs initialization for a memory.

F. Allocate addresses to the initialized memory.

G. Notify an OS that the newly added memory is available, and report the addresses and a capacity of the newly added memory simultaneously.

H. The OS completes an online (online) operation of the memory.

I. If the entire process is completed successfully, the LED of the power supply becomes steady on, indicating that the hot-add procedure ends.

J. If the hot-add procedure fails, set the LED of the power supply to steady off, and power off the memory riser; simultaneously, set the LED of the button to steady on, notifying a user of a hot-add failure.

Figure 6E:
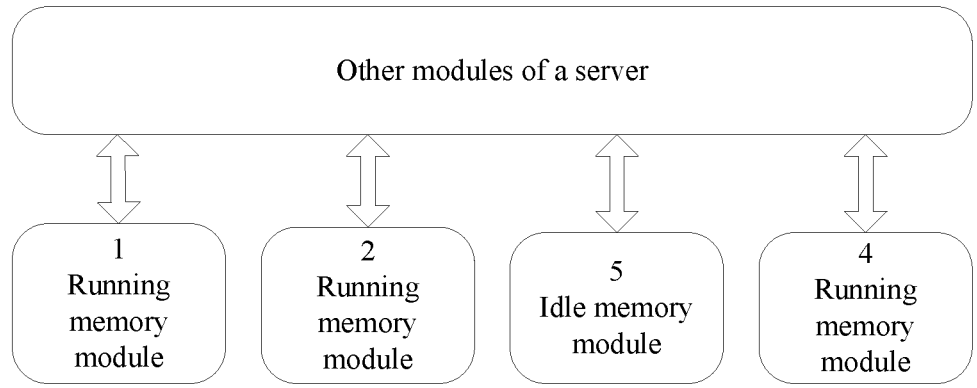
FIG. 6E is a schematic diagram of a server in which an idle memory module is replaced, according to another embodiment of the present invention.

However, in this embodiment of the present invention, step F) to step H) in the foregoing procedure do not need to be executed when the new memory module is added as a memory module in an idle state. That is, power is supplied to the memory module 5 in FIG. 6D and the memory module 5 is initialized. However, no physical address is allocated to the memory module 5, so that the memory module 5 becomes a memory module in an idle state in the server (as shown in FIG. 6E), which provides, for hot-removing memory modules 1, 2, and 4 in a running state, a condition of migrating from an HA address to another HA address.

According to the data migration method for memory modules in a server that is provided in this embodiment of the present invention, by establishing a mirror relationship between agent apparatuses of two memory modules, a processor instructs the agent apparatuses to perform data migration between the two memory modules, to complete migration of data from one memory module to the other memory module. The entire data migration process requires no participation of an operating system, and consumes a short period of time, thereby implementing convenient data migration for memory modules in a server. Therefore, a memory module in a running state can be conveniently hot-removed, and a read or write operation of the processor for the running memory module can still be received during the data migration process, thereby causing no data error.

Figure 9:
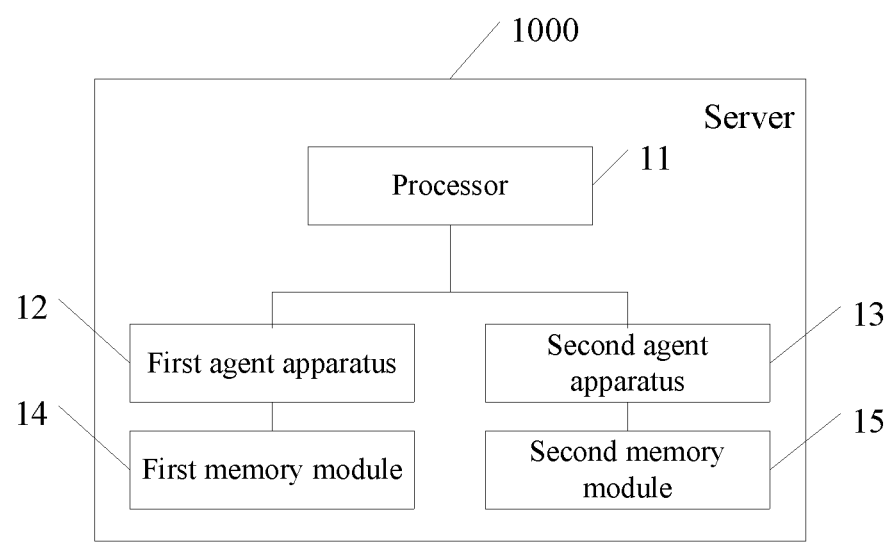
FIG. 9 is a schematic structural diagram of a server according to the an embodiment of the present invention.

FIG. 9 is a structural schematic diagram of a server 1000 according to an embodiment of the present invention. As shown in FIG. 9, the server 1000 includes:

a processor 11, a first agent apparatus 12 and a second agent apparatus 13 that are connected to the processor, a first memory module 14 connected to the first agent apparatus 12, and a second memory module 15 connected to the second agent apparatus 13; where:

the processor 11 is configured to search for the second memory module 15 when the processor 11 receives a data migration request of a user for the first memory module 14, the first memory module 14 is in a running state, and the second memory module 15 is in an idle state; and send a mirror relationship establishment instruction to the first agent apparatus 12;

the first agent apparatus 12 is configured to receive the mirror relationship establishment instruction, and establish a mirror relationship with the second agent apparatus 13 after receiving the mirror relationship establishment instruction;

the processor 11 is further configured to send a data migration instruction to the first agent apparatus 12 after the establishment of the mirror relationship is complete;

the first agent apparatus 12 is further configured to receive the data migration instruction, and send data in the first memory module 14 to the second agent apparatus 13 after receiving the data migration instruction;

the second agent apparatus 13 is configured to receive the data sent by the first agent apparatus 12, and write the data into the second memory module 15;

the processor 11 is further configured to: after migration of the data is complete, send a mirror relationship canceling instruction to the first agent apparatus 12; and after sending the mirror relationship canceling instruction, set the first memory module 14 and the second memory module 15 to an idle state and a running state, respectively; and the first agent apparatus 12 is further configured to cancel the mirror relationship with the second agent apparatus 13 after receiving the mirror relationship canceling instruction.

By establishing a mirror relationship between agent apparatuses of two memory modules, a processor in a server that is provided in this embodiment of the present invention instructs the agent apparatuses to perform data migration between the two memory modules, to complete migration of data from one memory module to the other memory module. The entire data migration process requires no participation of an operating system, and consumes a short period of time, thereby implementing convenient data migration for memory modules in a server.

The present invention further provides another embodiment of a server. The server includes:

a processor, a first agent apparatus and a second agent apparatus that are connected to the processor, a first memory module connected to the first agent apparatus, and a second memory module connected to the second agent apparatus; where:

the processor is configured to: when the processor receives a data migration request of a user for the first memory module, the first memory module is in a running state, and the second memory module is in an idle state, search for the second memory module, and send a mirror relationship establishment instruction to the first agent apparatus;

the first agent apparatus is configured to receive the mirror relationship establishment instruction, and establish a mirror relationship with the second agent apparatus after receiving the mirror relationship establishment instruction;

the processor is further configured to send a data migration instruction to the first agent apparatus after the establishment of the mirror relationship is complete;

the first agent apparatus is further configured to receive a data read instruction sent by the processor, read the data in the first memory module after receiving the data read instruction, and return the data in the first memory module to the processor;

the first agent apparatus is further configured to receive the data in the first memory module that is written by the processor, and send the data in the first memory module to the second agent apparatus;

the second agent apparatus is configured to receive the data sent by the first agent apparatus, and write the data into the second memory module;

the processor is further configured to write first data to a first physical address of the first agent apparatus;

the first agent apparatus is further configured to forward the first data to the second agent apparatus after receiving the first data;

the second agent apparatus is further configured to write the first data to the first physical address in the second memory module after receiving the first data forwarded by the second agent apparatus;

the processor is further configured to: after migration of the data is complete, send a mirror relationship canceling instruction to the first agent apparatus; and after sending the mirror relationship canceling instruction, set the first memory module and the second memory module to an idle state and a running state, respectively;

the first agent apparatus is further configured to cancel the mirror relationship with the second agent apparatus after receiving the mirror relationship canceling instruction;

the processor is further configured to: after the migration of the data is complete and after sending the mirror relationship canceling instruction, power off the first memory module, so as to remove the first memory module; and the processor is further configured to: when receiving a memory module adding request of the user, supply power to an added memory module, and initialize the added memory module, and the added memory module becomes an idle memory module.

By establishing a mirror relationship between agent apparatuses of two memory modules, a processor in a server that is provided in this embodiment of the present invention instructs the agent apparatuses to perform data migration between the two memory modules, to complete migration of data from one memory module to the other memory module. The entire data migration process requires no participation of an operating system, and consumes a short period of time, thereby implementing convenient data migration for memory modules in a server. Therefore, a memory module in a running state can be conveniently hot-removed, and a read or write operation of the processor for the running memory module can still be received during the data migration process, thereby causing no data error.

It may be clearly understood by a person skilled in the art that, for the purpose of convenient and brief description, for a detailed working process of the foregoing device and module, refer to a corresponding process in the foregoing method embodiments, and details are not described herein again.

In the several embodiments provided in the present application, it should be understood that the disclosed device and method may be implemented in other manners. For example, the described apparatus embodiment is merely exemplary. For example, the module division is merely logical function division and may be other division in actual implementation. For example, a plurality of modules or components may be combined or integrated into another device, or some features may be ignored or not performed. In addition, the displayed or discussed mutual couplings or direct couplings or communication connections may be implemented through some communication interfaces. The indirect couplings or communication connections between the apparatuses or modules may be implemented in electronic, mechanical, or other forms.

The modules described as separate parts may or may not be physically separate, and parts displayed as modules may or may not be physical units, may be located in one position, or may be distributed on a plurality of network units. A part or all of the modules may be selected according to actual needs to achieve the objectives of the solutions of the embodiments.

In addition, functional modules in the embodiments of the present invention may be integrated into one processing module, or each of the modules may exist alone physically, or two or more modules are integrated into one module.

Based on the foregoing descriptions of the embodiments, a person skilled in the art may clearly understand that each implementation manner may be implemented by software in addition to a necessary general hardware platform or by hardware. Based on such an understanding, the foregoing technical solutions essentially or the part contributing to the prior art may be implemented in a form of a software product. The software product is stored in a computer readable storage medium, such as a ROM/RAM, a hard disk, or an optical disc, and includes several instructions for instructing a computer device (which may be a personal computer, a server, a network device, or the like) to perform the methods described in the embodiments or some parts of the embodiments.

The foregoing implementation manners are not intended to limit the protection scope of the technical solutions. Any modification, equivalent replacement, and improvement made without departing from the spirit and principle of the foregoing implementation manners shall fall within the protection scope of the technical solutions.

What is claimed is:

1. A method for migrating data between memory units in a server, wherein the server comprises a processor, a first memory unit controlled by a first memory management circuit, and a second memory unit controlled by a second memory management circuit, the method comprising:
   receiving, by the processor, a data migration request for migrating a data block from the first memory unit to the second memory unit;
   obtaining, by the processor, the data block from a first address in the first memory unit;
   sending, by the processor, a data migration instruction to the first memory management circuit, wherein the data migration instruction comprises the data block and the first address;
   forwarding, by the first memory management circuit, the data block and the first address to the first memory unit, for storing the data block at the first address of the first memory unit;
   sending, by the first memory management circuit, the data block and the first address to the second memory management circuit; and
   forwarding, by the second memory management circuit, the data block and the first address to the second memory unit, for storing the data block in the second memory unit at a second address, wherein the first address and the second address are correlated with each other in a mirror relationship.

2. The method according to claim 1, wherein the first memory management circuit is a first home agent, and the second memory management circuit is a second home agent.

3. The method according to claim 1, wherein sending, by the processor, the data migration instruction to the first memory management circuit comprises:
   sending, by the processor, the data block and the first address to a node controller; and
   forwarding, by the node controller, the data block and the first address to the first memory management circuit.

4. The method according to claim 1, wherein sending the data block and the first address to the second memory management circuit comprises:
   sending, by the first memory management circuit, the data block and the first address to the second memory management circuit through one or more node controllers.

5. The method according to claim 1, further comprising:
   establishing, by the processor, a mirror relationship between addresses in the first memory unit and addresses in the second memory unit;
wherein the mirror relationship is such that the first address in the first memory unit is the same as the second address in the second memory unit.

6. The method according to claim 1, further comprising:
   setting, by the first memory management circuit, the first memory unit to an idle state; and
   setting, by the second memory management circuit, the second memory unit to a running state.

7. The method according to claim 1, wherein the first memory unit and the second memory unit have the same capacity.

8. A server, comprising:
   a processor, a first memory management circuit and a second memory management circuit that are connected to the processor, a first memory unit connected to the first memory management circuit, and a second memory unit connected to the second memory management circuit, wherein:
   the processor is configured to: receive a data migration request for migrating a data block from the first memory unit to the second memory unit, obtain the data block from a first address in the first memory unit, and send a data migration instruction to the first memory management circuit, wherein the data migration instruction comprises the data block and the first address;
   the first memory management circuit is configured to: receive the data migration instruction, forward the data block and the first address to the first memory unit for storing the data block at the first address of the first memory unit, and send the data block and the first address to the second memory management circuit; and
   the second memory management circuit is configured to: receive the data block and the first address from the first memory management circuit, and forward the data block and the first address to the second memory unit, for storing the data block in into the second memory module unit at a second address, wherein the first address and the second address are correlated with each other in a mirror relationship.

9. The server according to claim 8, wherein the first memory management circuit is a first home agent, and the second memory management circuit is a second home agent.

10. The server according to claim 8, further comprising one or more node controllers, wherein in sending the data migration instruction to the first memory management circuit, the processor is configured to send the data block and the first address to a node controller, and the node controller is configured to transfer the data block and the first address to the first memory management circuit.

11. The server according to claim 8, further comprising one or more node controllers, wherein the second memory management circuit is configured to receive the data block and the first address from the first memory management circuit through the one or more node controllers.

12. The server according to claim 8, wherein the first memory management circuit is further configured to set the first memory unit to an idle state; and the second memory management circuit is further configured to set the second memory unit to a running state.

13. The server according to claim 8, wherein the first memory unit and the second memory unit have the same capacity.

* * * * *